Figure 1:
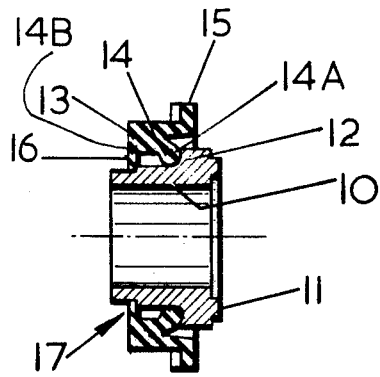

United States Patent [19]
Potter

[11] 4,247,123
[45] Jan. 27, 1981

[54] SEALS

[75] Inventor: Charles W. Potter, Manchester, England

[73] Assignee: J. H. Fenner & Co., Ltd., England

[21] Appl. No.: 41,450

[22] Filed: May 22, 1979

[30] Foreign Application Priority Data

May 24, 1978 [GB] United Kingdom ............... 22057/78

[51] Int. Cl.³ ............................................. F16J 15/34
[52] U.S. Cl. .......................................... 277/88; 277/92
[58] Field of Search ............................. 277/88, 89, 92

[56] References Cited
U.S. PATENT DOCUMENTS

| | | | |
|---|---|---|---|
| 2,984,506 | 5/1961 | Andresen et al. | 277/88 |
| 2,994,547 | 8/1961 | Dolhun et al. | 277/88 |
| 3,273,901 | 9/1966 | Schmengler | 277/92 |
| 3,322,431 | 5/1967 | Solari | 277/92 |
| 3,457,870 | 7/1967 | Sleeter | 277/88 |
| 4,111,436 | 9/1978 | Yazawa | 277/92 |

Primary Examiner—Robert I. Smith
Attorney, Agent, or Firm—Sughrue, Rothwell, Mion, Zinn and MacPeak

[57] ABSTRACT

An end face seal has a sealing bush with an external circumferential shoulder and is surrounded by an elastomeric loading sleeve which has an inwardly-directed frusto-conical diaphragm abutting the shoulder to load the sealing bush and a radial web directed towards the sealing bush.

8 Claims, 6 Drawing Figures

SEALS

This invention relates to end face seals especially but exclusively suitable for use in water pump seal assemblies.

The invention has particular application to springless end face seal assemblies.

It is an object of the present invention to provide an end face seal which can be adapted to provide additional face seal loading when necessary or desired and efficient seal face alignment.

According to the present invention there is provided an end face seal comprising a sealing bush with an external circumferential shoulder, and an elastomeric loading sleeve surrounding but spaced from the sealing bush and having an inwardly-directed frusto-conical diaphragm abutting the shoulder to load the sealing bush, when operatively mounted, and a radial web directed towards the sealing bush.

FIGS. 1 to 6 show sectional views of six forms of end face seal according to the invention.

It will, of course, be manifest to the man skilled in the art that an end face seal assembly comprises a pair of end face seals in abutting relationship with one normally secured to a rotating shaft with the other stationary in a casing housing the rotating shaft. An example is an end face seal assembly in a water pump.

Each of the end face seals comprises a sealing bush 10 whereof the running face is indicated at 11.

The sealing bush 10 has an external peripheral shoulder 12 and its running face 11 is relatively narrow radially.

The sealing bush 10 is surrounded by an elastomeric sleeve 13 which has an inwardly inclined frusto-conical diaphragm 14 which acts through the intermediary of an integral lobe 14A on the shoulder 12 of the sealing bush 10 axially to load same, an integral inwardly-radial web 14B of the sleeve 13 resiliently engaging the sealing bush at a location remote from the shoulder 12. The elastomeric sleeve 13 also has an outwardly-directed flange 15. Bonded to the elastomeric sleeve 13 at its end remote from shoulder 12 is a metal or plastics washer 16.

In FIG. 1 the washer 16 which is surrounded by elastomeric material of the sleeve 13 engages a stepped portion 17 of the sealing bush 10. The provision of the washer 16 prevents the seal from moving tangentially relative to the running face 11 in high pressure applications.

Figure 2:
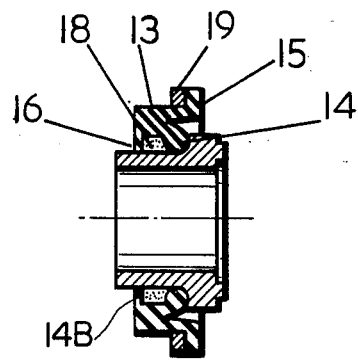

The end face seal of FIG. 2 is identical in general construction with that of FIG. 1 save that the annular cavity 18 between an inwardly directed elastomeric flange sealing on the bush diameter and the lobe 14 is filled with an inert liquid so that pressure transference to the flange 15 augments the axial load at running face 11.

For applications where pressure conditions can deflect the flange 15 a metal or plastics washer 19 is provided as a reinforcement.

Figure 3:
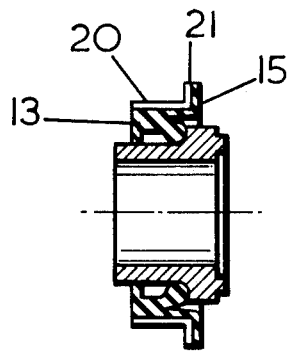

FIG. 3 shows a construction identical with that of FIG. 1 save that the elastomeric sleeve 13 is surrounded by a metal reinforcing sleeve 20 having a flange 21 abutting flange 15 of the sleeve ring 13 for applications where high interference and a metal cased body is required.

Figure 4:
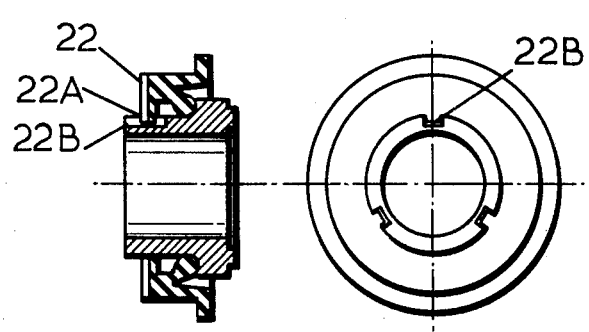

In FIG. 4 an additional metal or plastics washer 22 is provided to ensure rear axial alignment of the seal. To absorb torque reaction the washer 22 has projecting keys 22A engaging in complementary grooves 22B in the bush 10.

Figure 5:
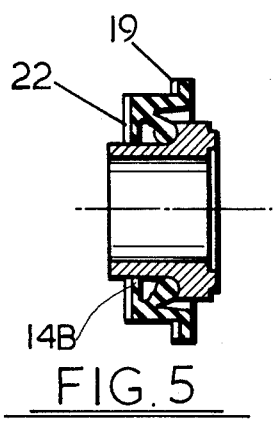

In FIG. 5, the seal uses both the metal washer 19 of FIG. 2 and the additional washer 22 of FIG. 4 for the purposes aforesaid.

Figure 6:
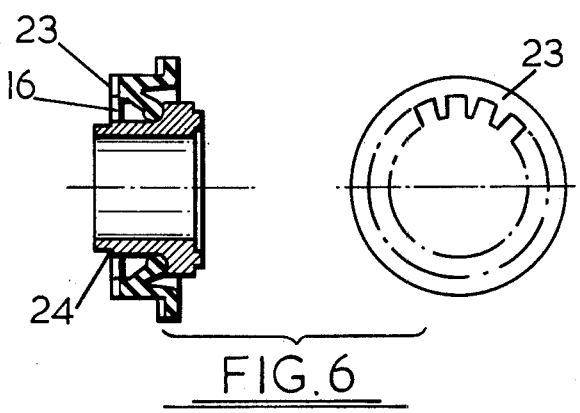

Finally, in FIG. 6 the seal has bonded to its rear web or flange 16 spring washer 23 which is normally clear of a shoulder 24 on the bush diameter but which abuts the shoulder 24 when loaded to the correct working length.

What is claimed is:

1. An end face seal, comprising: a stationary sealing bush (10) having an end running face (11), an external circumferential shoulder (12) integral with the sealing bush adjacent the end running face, and loading means for urging the sealing bush into sealing contact with a complementary sealing bush and comprising an elastomeric loading sleeve (13) having a main portion surrounding the sealing bush, an inwardly-directed, frusto-conical diaphragm (14) integral with the loading sleeve abutting the circumferential shoulder and surface of the bush adjacent thereto to impart loading from the loading sleeve to the sealing bush, and, at an end of the loading sleeve remote from the circumferential shoulder of the sealing bush, an integral inwardly-directed radial web (14B) in resilient engagement with the sealing bush.

2. A seal as claimed in claim 1, in which the diaphragm terminates in a lobe abutting the shoulder.

3. A seal as claimed in claim 1 in which the radial web embodies a washer engaging a stepped portion of the sealing bush.

4. A seal as claimed in claim 2 or 3, in which the radial web, lobe and sealing bush define a cavity loaded with an inert liquid.

5. A seal as claimed in any one of claims 1, 2 or 3, in which the elastomeric sleeve has an outwardly-directed flange reinforce by a metal or plastics washer.

6. A seal as claimed in claim 4 in which the elastomeric sleeve is surrounded by a metal sleeve having an integral flange abutting the elastomeric sleeve flange, the washer being omitted.

7. A seal as claimed in any one of claims 2 or 3, comprising an additional washer bonded to the radial web.

8. A seal as claimed in any one of claims 2 or 3 comprising a spring washer bonded to the radial web.

* * * * *